United States Patent
Gooch et al.

(10) Patent No.: US 7,672,293 B2
(45) Date of Patent: Mar. 2, 2010

(54) HARDWARE THROTTLING OF NETWORK TRAFFIC SENT TO A PROCESSOR BASED ON NEW ADDRESS RATES

(75) Inventors: Mark Gooch, Roseville, CA (US); Robert L. Faulk, Jr., Roseville, CA (US); Bruce E. LaVigne, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 687 days.

(21) Appl. No.: 11/373,631

(22) Filed: Mar. 10, 2006

(65) Prior Publication Data
US 2007/0211626 A1    Sep. 13, 2007

(51) Int. Cl.
*H04L 12/28* (2006.01)

(52) U.S. Cl. ...................... 370/351; 370/352

(58) Field of Classification Search ............... 370/351, 370/352, 354, 356; 379/112.01, 112.06, 379/112.1
See application file for complete search history.

(56) References Cited

U.S. PATENT DOCUMENTS

| | | | | |
|---|---|---|---|---|
| 5,542,080 A | * | 7/1996 | Yoshida | 712/25 |
| 5,566,170 A | * | 10/1996 | Bakke et al. | 370/392 |
| 6,118,761 A | * | 9/2000 | Kalkunte et al. | 370/229 |

* cited by examiner

*Primary Examiner*—Chi H Pham
*Assistant Examiner*—Fan Ng (57) ABSTRACT

In an embodiment of the invention, a method and apparatus for hardware throttling of network traffic, includes: receiving a packet; and preventing the packet from being copied, based on a rate field value associated with a new address in the packet information in the packet. The packet is not copied even if a copy rule is triggered.

22 Claims, 4 Drawing Sheets

Lookup Flag Fields 205

| | MAC SA lookup | | MAC DA lookup | | IP SA lookup | | IP DA lookup | | |
|---|---|---|---|---|---|---|---|---|---|
| | Valid 210 | Match 211 | Valid 220 | Match 221 | Valid 230 | Match 231 | Valid 240 | Match 241 | |
| Entry0 280 | 1 | 0 | X | X | X | X | X | X | --- |
| Entry1 281 | 1 | 0 | X | X | X | X | X | X | --- |
| --- | | | | | | | | | |

Lookup Fields 206

| | MAC SA 250 | MAC DA 251 | IP SA 252 | IP DA 253 | Ingress Port 254 | VLAN ID 255 | Packet protocol 256 | |
|---|---|---|---|---|---|---|---|---|
| | | | | | | | | |
| | | X | X | X | X | X | X | --- |
| | X | X | X | X | X | X | X | --- |
| | | | | | | | | |

Rate and Threshold Fields 207

| | Measured rate 260 | Rate threshold 261 | |
|---|---|---|---|
| Entry0 280 | | 50 | --- |
| Entry1 281 | | 100 | --- |
| --- | | | |

Action Fields 208

| | Uncopy flag 270 | |
|---|---|---|
| Entry0 280 | 1 | --- |
| Entry1 281 | 1 | --- |
| --- | | |

HARDWARE THROTTLING OF NETWORK TRAFFIC SENT TO A PROCESSOR BASED ON NEW ADDRESS RATES

TECHNICAL FIELD

Embodiments of the invention relate generally to network systems, and more particularly to an apparatus and method for hardware throttling of network traffic copied (sent) to a processor (i.e., CPU) based on new address rates.

BACKGROUND

A typical network switch (or router) has a hardware-based fast path for forwarding packets, and a software/CPU-based slower path for learning packet addresses and connections. Specifically, a network switch (or router) typically includes dedicated hardware for forwarding network packets at high speed by using forwarding table lookups (e.g., hashing, content addressable memories or CAMS, etc.), and one or more central processing unit (CPU) subsystems that are used to program the forwarding tables. The CPU is also responsible for maintaining network operation by using specific network protocols (e.g., handling route updates, address resolution protocol (ARP) queries/replies, Internet Control Message Protocol (ICMP) messages, spanning tree related packets, etc.) as well as user interface functionality. Thus it is vital that traffic is not sent to the CPU(s) at too great a rate, as a high rate can impact the normal functionality that the CPU should perform.

A network switch or router forwards traffic by performing a number of lookups (typically in dedicated hardware tables) on the addresses in packets. Examples of such lookups include the following:

(i) A lookup on the Media Access Control source address (MAC SA) of a packet, which is used to associate hosts with a specific physical port on the switch (or router). This type of lookup is used to detect new hosts (a learn) or a host that has moved ports (a move).

(ii) A lookup on the MAC destination address (MAC DA) of a packet, which is used to determine which port of the switch (or router) the packets should be sent to for a bridged packet. If the packet is to be routed, then this will be indicated from the data returned by the MAC DA lookup.

(iii) For packets that are to be routed, a lookup on the Internet Protocol destination address (IP DA) of the packet is needed. This is used to determine which port of the switch (or router) the packet should be sent to, and also to determine the new MAC DA of the packet.

(iv) Other lookups can be performed for security or other types of functionality, such as IP source address (IP SA) lookups or flow-based lookups (based on both IP SA and IP DA).

If a lookup operation fails, then a packet can be copied to one of the CPUs (a copy operation) for further analysis and forwarding. This so-called software forwarding is a much slower operation than hardware forwarding, and so an entry is usually then made in the hardware tables by the CPU. Thus subsequent packets with identical addresses will then be processed solely by hardware.

Packets that are sent to a CPU (i.e., packets that are "copied") are typically prioritized into one of a number of CPU queues (typically from 2 to 8 queues). The memory space of the CPU will typically contain these queues that will be serviced in priority order, i.e., packet traffic placed in the highest priority queue will be processed first before processing packet traffic placed in the lower priority queues. Packets in the lower priority queues may even be discarded should the packet rate to the CPU exceed the packet rate which the CPU can actually process. Thus it is important to correctly prioritize packets into the correct CPU queue.

There are a variety of reasons for copying packets to a CPU for further processing. The one of concern here is that when a new address is seen by the switch (or router), then the new address must be examined by the CPU (for address validation and learning) and programmed into the hardware forwarding tables to permit hardware forwarding on future packets with the same address.

However, such a method is susceptible to Denial of Services (DoS) type attacks which typically involve a malicious host sending packets with a stream of new addresses. When these packets arrive at a switch (or router), these packets are sent to the CPU, which results in the CPU being overloaded by many packets, and as a result the CPU spends almost all of its time operating on these packets at the expense of genuine (i.e., non-DoS) packets. This can result in a severe performance penalty and even total loss of certain switch or router functionalities (e.g., if route updates are continually missed, then routing functionality can be negatively impacted).

Prior solutions attempt to mitigate some of the CPU overload by implementing more specific queuing strategies, such that "problem" packets are re-directed to a low priority CPU queue as discussed in, for example, commonly-assigned U.S. patent application Ser. No. 11/198,056, by Mark Gooch, Robert L. Faulk, Jr. & Bruce LaVigne, filed on Aug. 5, 2005, and entitled "PRIORITIZATION OF NETWORK TRAFFIC SENT TO A PROCESSOR BY USING PACKET IMPORTANCE", which is hereby fully incorporated by reference herein. This method can have some success, but it is generally preferable to not copy such packets to the CPU at all.

Therefore, the current technology is limited in its capabilities and suffers from at least the above constraints and deficiencies.

SUMMARY OF EMBODIMENTS OF THE INVENTION

An embodiment of the invention provides a method and apparatus for hardware throttling of network traffic, including: receiving a packet; and preventing the packet from being copied, based on a rate field value associated with a new address in the packet information in the packet. The packet is not copied even if a copy rule is triggered. As an example, an embodiment of the invention provides a method and system that intercepts packet traffic streams when certain rates have been reached for new addresses that are detected, and imposes throttling on packets that are sent to the CPU from such traffic streams. The throttling allows control of the rate of how many such packets per second are allowed to be sent to the CPU for processing, with the rate being programmable over any reasonable range from 0 to millions of packets or bytes per second, or more.

An advantage of an embodiment of the invention is that the amount of non-useful traffic that is received by the processor (i.e., CPU) is reduced. This permits the network device (e.g., network switch or router) to continue to operate normally even when being flooded by many packets with new addresses or many new connections such as those that occur during a DoS-type attack.

These and other features of an embodiment of the present invention will be readily apparent to persons of ordinary skill in the art upon reading the entirety of this disclosure, which includes the accompanying drawings and claims.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments of the invention.

Figure 1:
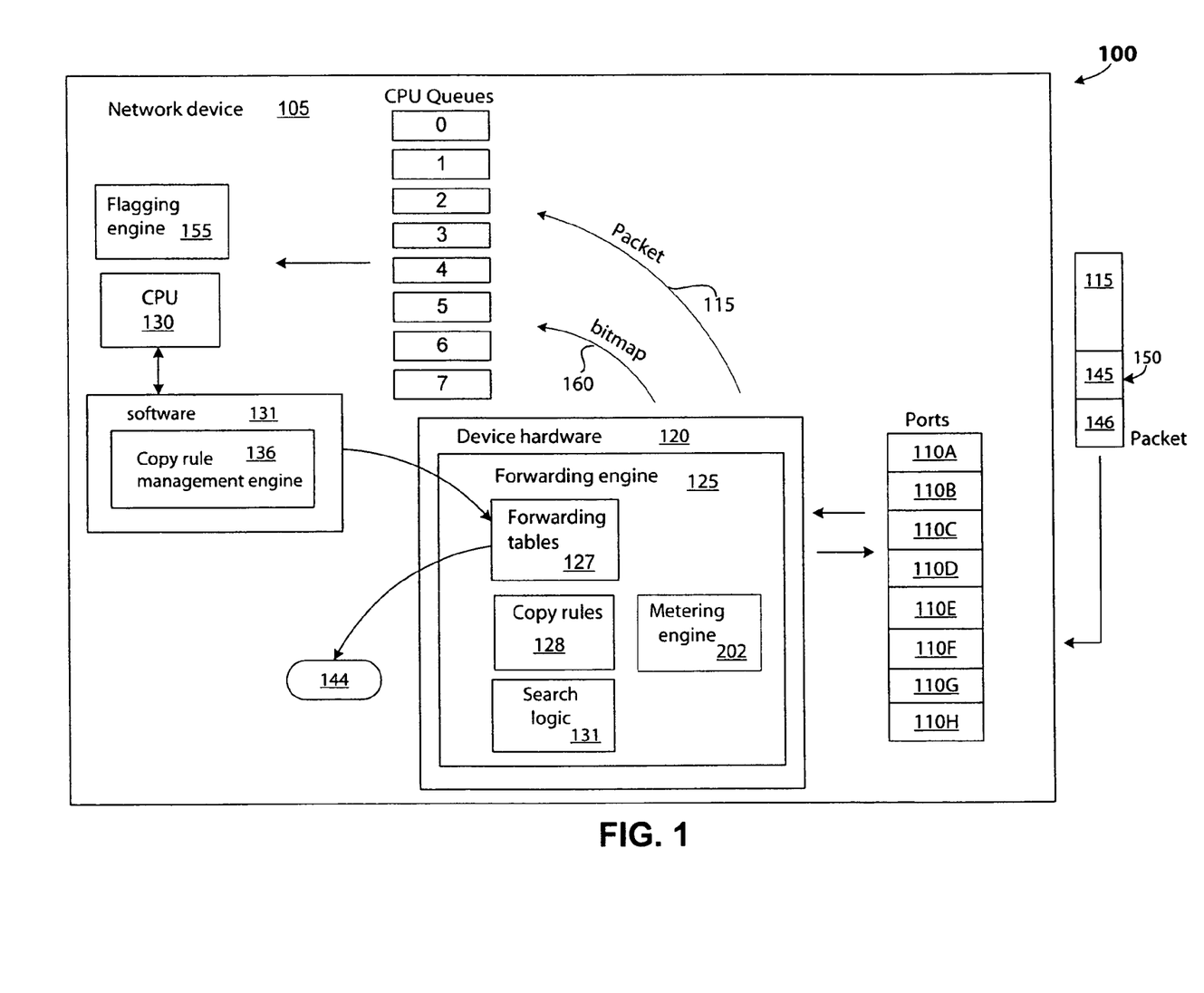
FIG. 1 is a block diagram of a system (apparatus), in accordance with an embodiment of the invention.

FIG. 1 is a block diagram of a system (apparatus) 100, in accordance with an embodiment of the invention. The system 100 includes a network device 105 which, for example, typically is a network switch or a router. Each one of the ports 110 in the network device 105 can receive the network packets 115. In the example of FIG. 1, the ports 110A-110H are shown in the network device 105, although the number of ports 110 can vary.

The forwarding engine 125 performs a number of lookup operations on the address fields of a packet 115 that is received by the network device 105. Specifically, the forwarding engine 125 will forward the packet 115 at high speed by typically using forwarding table lookups, so that the network device 105 can forward the packet 115 to its next destination. As an example, for a layer-2 switch functionality, the forwarding engine 125 will perform a lookup on the MAC (Media Access Control) source address of the packet 115 to determine if the packet 115 was received on a proper port 110 and to determine which port to send out the packet 115 by looking up the MAC destination address. Additionally, for IP routing functionality, a lookup is typically performed on the Internet Protocol (IP) destination address of the packet 115 in order to determine the routing destination of the packet.

In addition, other types of lookups may be performed on the packet 115 for security-type functionalities. For example, the forwarding engine 125 may perform a lookup on the IP source and IP destination addresses (i.e. a flow-based lookup), in order to determine if the source node is permitted to communicate with the destination node. Other types of lookups can also be performed on the packet, based on the functionalities that are configured in the network device 105.

In an embodiment of the invention, search logic 131 will read the packet information 150, values of valid bits and match bits, and packet rate meter values related to the packet information 150, in order to limit the number of packets 115 that are copied and sent to the CPU 130 for processing. Note that the field 150 in the drawings can be referred to as "packet information" or as "packet header". The field 150 typically includes the sub-fields 145 & 146 as discussed below, and typically includes other fields that are contained in a packet header. The functionalities of the search logic 131 is described in further details in the example of FIG. 2 as discussed below.

Ordinarily, the forwarding engine 125 will send a packet 115 for processing by the CPU 130, if the packet 115 matches at least one of the copy rules 128 that are maintained in the device hardware 120. Further details on methods for comparing packet information with the copy rules 128 are also discussed in the previously-cited U.S. patent application Ser. No. 11/198,056, entitled "PRIORITIZATION OF NETWORK TRAFFIC SENT TO A PROCESSOR BY USING PACKET IMPORTANCE". However, an embodiment of the invention provides a method that will advantageously limit the number of packets that are sent for processing by the CPU 130, as discussed in further detail below with reference to FIG. 2.

Typically, a set of copy rules 128 is used for comparison with the packet 115, although only one copy rule 128 could also be used for comparison with the packet 115. The CPU 130 is used to program the forwarding tables 127, to maintain network operation by using specific network protocols (e.g., handling route updates, ARP queries/replies, ICMP messages, spanning tree related packets, etc.), to permit user interface functionality, and to provide other functionalities that are known to those skilled in the art.

When information in the packet 115 matches at least one of the copy rules 128, the packet 115 is forwarded (copied) to the CPU 130 for processing. When a packet 115 is forwarded to the CPU 130, the packet 115 is denoted herein as a "copied" packet. Software 135 executing on the CPU 130 has copy rule management engine code 136 that associates each copy rule 128 with a programmable CPU queue value. Each CPU queue value is, in turn, assigned to a CPU queue. Therefore, the copy rule management engine software 136 assigns each copy rule to a particular CPU queue. Each CPU queue is typically a receive buffer in the memory space of the CPU 130. The device hardware forwarding engine 125 checks the packet 115 against each of the copy rules 128, in order to determine if the forwarding engine 125 should or should not copy the packet 115 to the CPU 130. The forwarding engine 125 also determines which CPU queue should receive the packet 115, by checking the packet 115 against each of the copy rules 128. The CPU queue that will receive the packet 115 will be the CPU queue that is associated with the matching copy rule with the highest priority (if the packet matches with multiple copy rules), or will be the CPU queue that is associated with the copy rule that matches the packet (if the packet matches with only one copy rule). In an embodiment of the invention, when the number of particular packets that are to be sent for processing by the CPU 130 is to be limited, then the particular packet may not be copied to the CPU even if the particular packets will trigger at least one of the copy rules 128.

The forwarding engine 125 checks the packet header 150 to determine which forwarding lookups to perform on the packet 115. The forwarding engine 125 then uses the results of the forwarding lookups (i.e., the forwarding information 144 associated with the packet 115) and the packet header 150 in order to determine if the packet 115 matches any of the copy rules 128. The packet header 150 includes, for example, the packet type information 145, packet source and destination addresses 146, and other information associated with the packet 115. If forwarding engine 125 determines that the packet 115 does not match any of the copy rules 128, then the forwarding engine 125 will not send the packet 115 to a CPU queue, and as a result, the packet is not sent to the CPU 130 for processing. Regardless of whether or not the packet is copied to the CPU, the results 144 of the forwarding lookups are used to forward the packet 115 out of the device 105, so that the packet 115 continues to be transmitted toward the eventual packet destination.

If the packet 115 matches one or more of the copy rules 128, the forwarding engine 125 will place the packet 115 into an appropriate CPU queue. As an example, assume that the CPU 130 supports 8 CPU queues (CPU queue 0 to CPU queue 7 in the example of FIG. 1). Note that the number of CPU queues supported by the CPU 130, the number of copy rules 128, and/or the reason associated with the copy rule (i.e., packet defined by the copy rule), may vary, depending on the desired functionality or functionalities in the network device 105. For example, if the network device 105 is not a router, then RULE02 (see Table 1 below) would typically not be included in the copy rules 128 because the network device would not need the route update information. The priority of each copy rule 128 may also vary or may be dynamically configurable or changeable, as discussed in the above cited U.S. patent application Ser. No. 11/198,056. A flagging engine 155 may also be implemented for informing the CPU 130 that a packet 115 has been placed in a CPU queue. Additionally, in another embodiment of the invention, multiple CPUs may be implemented in a network device with each CPU having an associated set of copy rules and queues for performing the functions described herein.

As an example, assume that there are 4 copy rules 128 which are listed in Table 1 below in priority order (from lowest priority rule to highest priority rule). Therefore, RULE00 is the lowest priority rule and RULE03 is the highest priority rule in Table 1. Each of these rules is assigned to a particular CPU queue.

In the above example, the copy rules 128, the reason corresponding to the copy rule (i.e., the packet defined by each particular copy rule 128), and the assigned CPU queue for each particular copy rule 128, are shown in Table 1:

TABLE 1

| Rule: Reason |
| --- |
| RULE00: This rule is for sampled packets (used for traffic statistics gathering). RULE00 has a configured CPU queue of 1. RULE01: This rule is for packets with new MAC source addresses (learns). RULE01 has a configured CPU queue of 3. RULE02: This rule is for IP (Internet Protocol) route updates. RULE02 has configured CPU queue of 5. RULE03: This rule is for packets indicating security violations. RULE03 has a configured CPU queue of 4. |

Note that the copy rules 128 may be reprogrammed by the copy rule management engine software 136 running on the CPU 130, so that a copy rule may be re-assigned to other CPU queues that are different from the configuration listed above in Table 1. As an example, a received packet 115 would fire (i.e., trigger) RULE00 if the packet 115 is a sample packet, and would be sent by the forwarding engine 125 to CPU 130 on CPU queue 1 with a reason (bitmap) 160 (FIG. 1) of $0001_2$ (i.e., bit 0 of the copy rule 128 is set, indicating that RULE00 was activated). The CPU 130 will then perform the appropriate processing of the packet 115.

As discussed in further detail below with reference to FIG. 2, in an embodiment of the invention, if the search logic 131 has detected that a packet has exceeded a packet rate associated with a given match-bit/valid-bit value pair, then the packet will not be copied to a CPU queue and will not be processed by the CPU 130, even if at least one of the copy rules 128 are triggered by the packet traffic.

Figure 2:
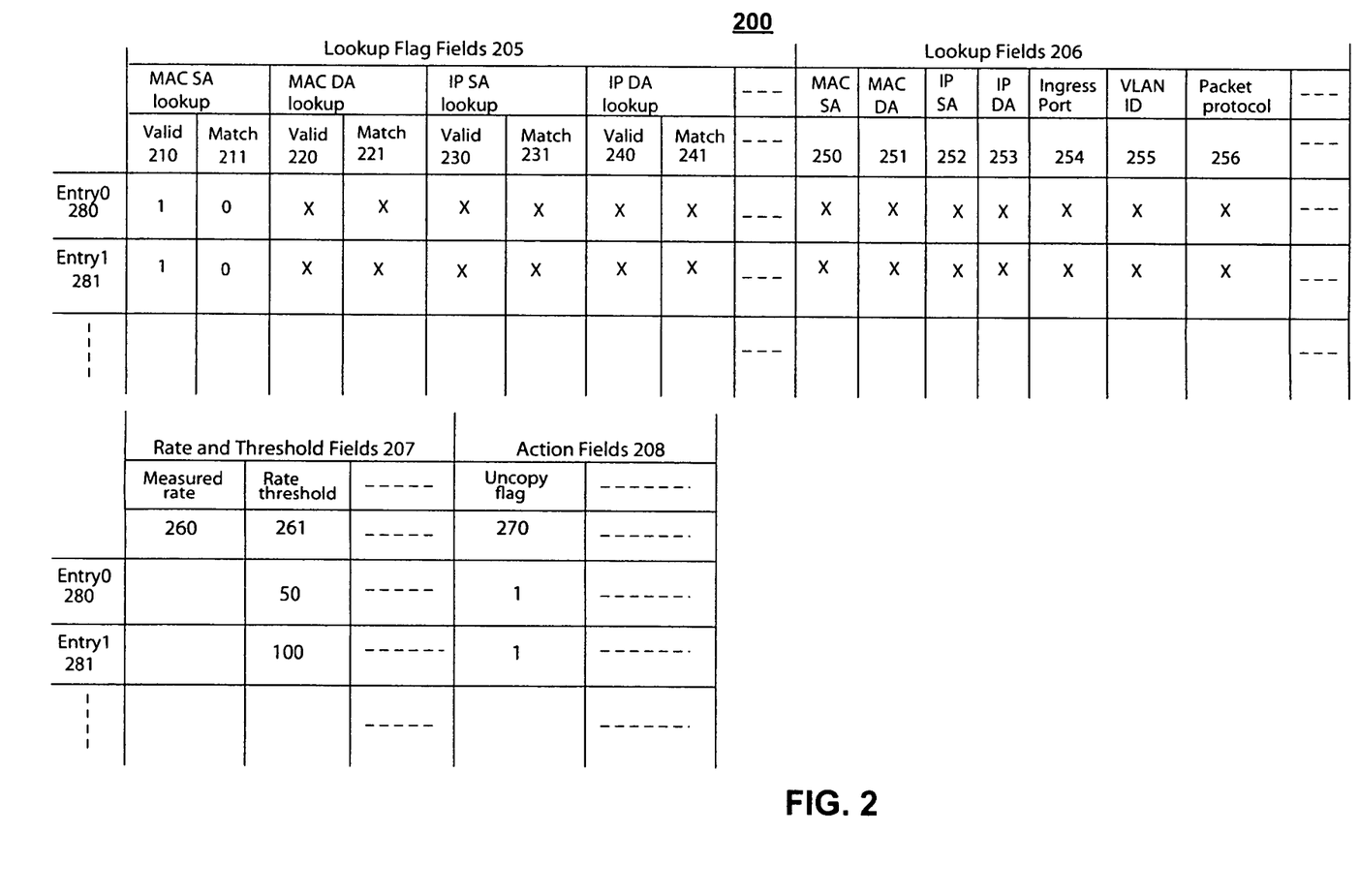
FIG. 2 is a block diagram that shows additional details of a table that can be used in an apparatus for throttling of network traffic, in accordance with an embodiment of the invention.

FIG. 2 is a block diagram that shows additional details of a table 200 that can be used in an apparatus for throttling of network traffic based on packet information and new address rates, in accordance with an embodiment of the invention. The table 200 is typically stored in the device hardware 120 (FIG. 1) as a part of the search logic 131 (FIG. 1). In an embodiment, the forwarding engine 125 (FIG. 1) has the ability to use the values of the valid and match bits, and the packet information (e.g., ingress port, egress port, MAC source and destination addresses, IP source and destination addresses, VLAN ID, packet protocol, or/and other information) as a part of a search key into normal Access Control List (ACL) style lookups or into other suitable lookup methods to determine the rate meter which will control if the packet will be copied or not copied to the CPU 130 (FIG. 1).

The forwarding engine 125 includes the search logic 131 (e.g., ACL search logic) (FIG. 1) that allows searching of certain fields in a packet 115 (FIG. 1). For example, the search logic 131 can search the packet information 150 (FIG. 1) for IP addresses, MAC addresses, port number receiving the packet, new addresses from a particular TCP connection, and/or other information in the packet 115. The search logic 131 can use a general purpose search logic to search the fields in the packet 115. The search logic 131 can be implemented by use of, for example, a content addressable memory (CAM) in order to perform ACL-type searching functionality at a faster speed.

For a packet 115 that is received by the network device 105, the search logic 131 will read the packet information 150. Each type of lookup into the forwarding tables 127 can be characterized by a valid bit value (e.g., a flag bit) that indicates whether or not the lookup was performed, and a match bit value (e.g., a flag bit) that indicates whether or not the lookup result was found in the forwarding tables 127, as indicated by the lookup flag fields 205 in the search logic 131.

For example, the MAC SA lookup will have an associated valid bit 210 and match bit 211, the MAC DA lookup will have an associated valid bit 220 and match bit 221, and so on for the IP SA lookup (valid and match bits 230/231), IP DA lookup (valid and match bits 240/241), etc. The search logic 131 also has the standard lookup fields 206 to match fields from the packet information 150 (e.g., MAC SA 250, MAC DA 251, IP SA 252, IP DA 253, ingress port 254, VLAN ID 255, packet protocol 256, etc.), as well as the standard rate and threshold fields 207 (e.g., measured rate 260, rate threshold 261, etc.) to measure the rate of reception of packets and the threshold rate, respectively. The measured rate 260 measures the rate of reception of packets, or bytes of packets, or any other measure derived from packets. The measured rate 260 measures an amount matching each specific entry (e.g. entry0 280, entry1 281, etc.) in the search logic 131. This rate and threshold functionality can, for example, use a bucket algorithm whereby tokens are added to a token bucket at a fixed rate (subject to the total not exceeding the rate threshold value) by a metering engine 202 (FIG. 1), and tokens are removed from the token bucket whenever a packet matches the entry in question. If a packet arrives and there are no tokens available, then the packet has exceeded the allowed rate for the specific entry in question.

The method of preventing the copying of the packet 115 is achieved by adding an uncopy flag 270 to the action fields 208. Thus when a packet 115 matches a specific entry (e.g. entry0 280), and the measured rate 260 of that entry is above the rate threshold 261 of that entry, then the uncopy flag 270 of that entry can be used to negate, or undo, any copy operation that would otherwise be performed on the packet. These packets are not copied to the CPU 130 even if the packet information 150 in the packets will trigger at least one of the copy rules 128. Since an embodiment of the invention can limit the number of packets 115 that are copied to the CPU 130, the CPU 130 is advantageously protected from being overwhelmed by misbehaving end nodes that, for example, are infected with a virus or are otherwise malfunctioning. This combination of valid and match bits combined with rate metering is effectively used as an "uncopy" rule that has a higher priority than the copy rules 128. Therefore, an embodiment of the invention provides the ability to look at the match and valid bits from lookups into the forwarding tables 127 and also uses the uncopy bit (uncopy flag 270) to prevent packets from being copied to the CPU 130. As a result, embodiments of the invention advantageously protect the CPU from being deluged from particular packet streams based on the valid/match bits and rate metering.

As an example, entry1 281 is configured in the search logic 131 to match all packets 115 having a new MAC SA (i.e. a learn), as is indicated by the MAC SA valid bit 210 of entry1 281 being set to "1" and the MAC SA match bit 211 of entry1 281 being set to "0". All other lookup flag fields 205 and lookup fields 206 of entry1 281 are set to "X", or don't care. The search logic 131 makes a comparison between the packet information 150 and the values in the lookup flag fields 205 and lookup fields 206. The rate threshold 261 of entry1 281 is set to 100 packets per second, and the uncopy flag 270 of entry1 281 is set to "1". Thus entry1 281 will limit the number of packets 115 having an unknown MAC SA (i.e. a learn) that are copied to CPU 130 to 100 per second. As a second example, entry0 280 is configured similarly, but has an additional restriction such that only packets 115 entering on port 5 are metered, as is indicated by the ingress port field 254 of entry0 280 being set to "5". Additionally, the rate threshold 261 of entry0 280 is set to 50 packets per second. Thus entry0 280 will limit the number of packets 115 having an unknown MAC SA (i.e. a learn) that arrive on port 5 of the network device 105 and are copied to CPU 130 to 50 per second.

Note that the table 200 is typically only a single table, and that each entry (e.g., entry0) has lookup flag fields 205 for searching, lookup fields 206 for searching, rate and threshold fields 207 for rate metering operations, and actions fields 208 for uncopying operations. The action fields 208 are also used for typical ACL operations that are known to those skilled in the art.

Note also that the above examples revolve around the use of the MAC SA valid/match bits. However, embodiments of the invention permit the use of other combinations that may involve the other fields in Table 200, and the use of different values in the fields for any entry in the Table 200. For example, for an entry, a value can be set in the VLAN ID field 255 or/and in the packet protocol field 256, in various combination with the example rate restrictions discussed above or as separate rate restrictions on the metering of packets. Also, each entry in Table 200 may have additional fields. For example, lookup fields 206 may have an egress port field for each entry, where the value in an egress port field permits an additional restriction to be set on packet traffic. Also, the particular values that may be set in various fields (e.g., values in the rate threshold fields 261, in the ingress port fields 254, and/or other fields) may be set to various values. Note further that the entries in table 200 may also vary in number, although only entry0 280 and entry1 281 are described in the example above for convenience.

Any combination of the available lookup flag fields 205 and lookup fields 206 may be used to implement a particular throttling operation. Thus it is possible to use the throttling operation to target only problem traffic. For example, if many new MAC SAs (i.e., learns) are being received on a particular switch port (e.g., port 110A in FIG. 1), which may occur, for example, if a host has been infected with a virus and is spoofing the MAC SA, then an ACL in the search logic 131 can be set up to throttle the copied learns on the affected port, as in the second example above. In this case, the packet may also have a "drop" action, so the virus is not spread to the rest of the network as well. This drop action can be enabled by setting a drop flag field to a value of "1" for an entry in the action fields 208. This precision allows the remaining network traffic on other ports to function normally, thus maintaining network integrity.

Figure 3:
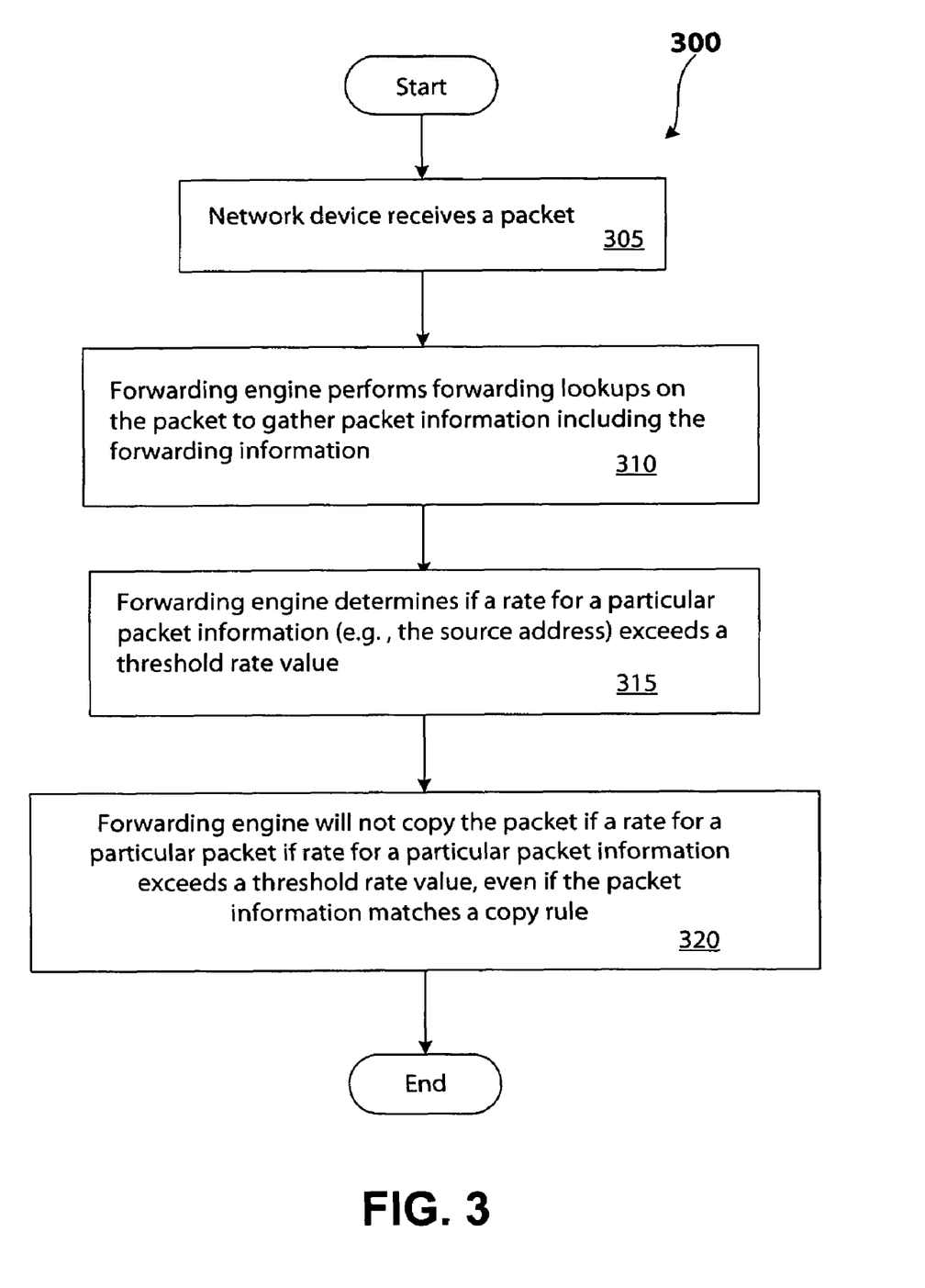
FIG. 3 is a flowchart of a method, in accordance with an embodiment of the invention.

FIG. 3 is a flowchart of a method 300, in accordance with an embodiment of the invention. The network device 105 first receives (305) a packet 115. The forwarding engine 125 performs (310) a standard set of forwarding lookups on the packet to gather the forwarding information 144 and to gather other packet information. The forwarding engine also determines (315) if a rate for a particular packet information (e.g., the source address of the packet) exceeds a threshold rate value. Various combinations of example fields in table 200 in FIG. 2 can be set, in order to set particular restrictions on packet traffic and to implement a particular throttling operation for packet traffic. The forwarding engine will not copy (320) the packet to a processor if a rate for a particular packet information exceeds a threshold rate value, even if the packet information matches a copy rule.

Figure 4:
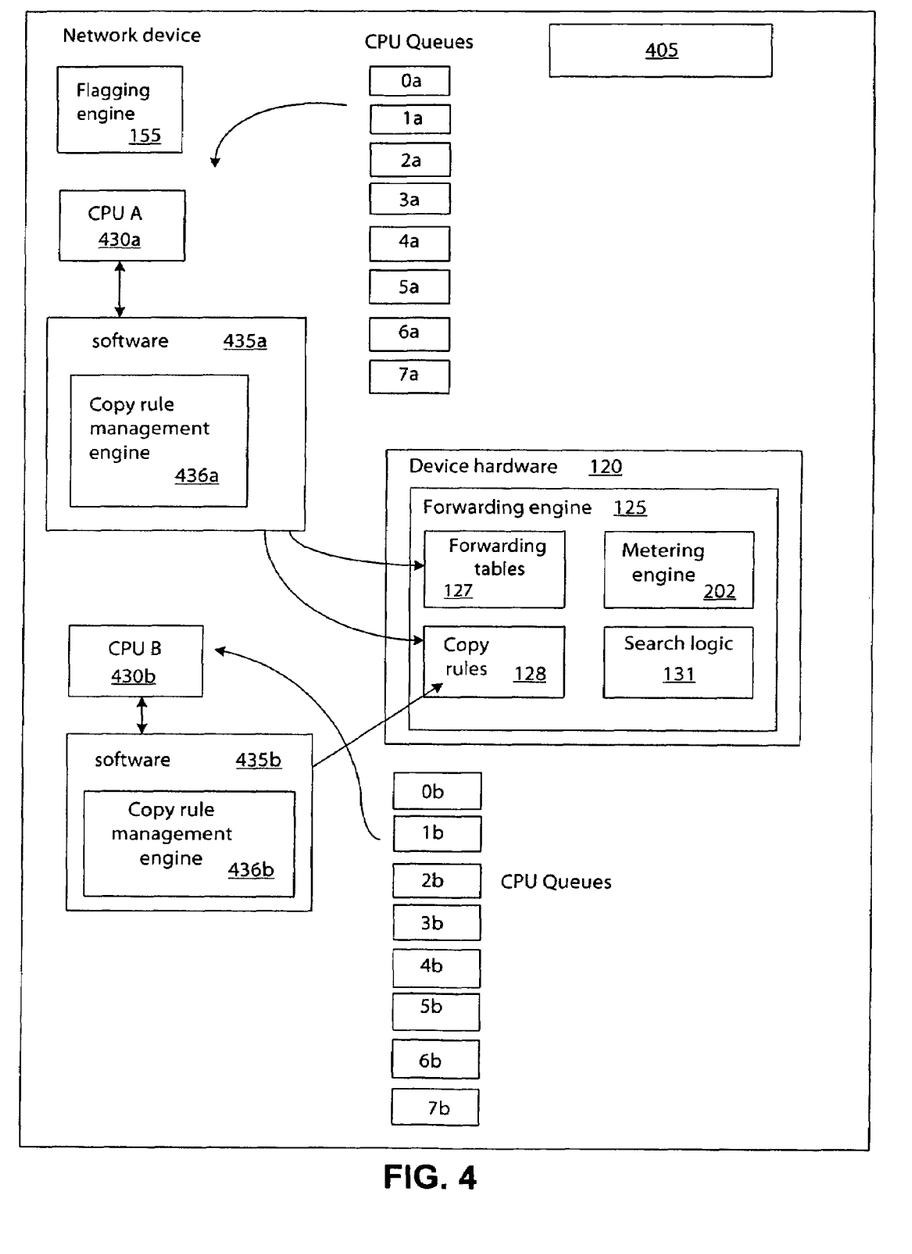
FIG. 4 is a block diagram of a system (apparatus), in accordance with another embodiment of the invention.

Multiple CPUs, with Independent Queues for Each CPU:

FIG. 4 is a block diagram of a system (apparatus) in accordance with another embodiment of the invention, where a network device 405 includes multiple CPUs 430a and 430b. Note that the number of CPUs may vary in number, where N is a suitable integer value. Each CPU controls its own set of queues. For example, CPU (A) 430a controls the queues 0a through 7a, and CPU (B) 430b controls the queues 0b through 7b. The number of queues controlled by each CPU may vary in number. The copy rule management engine 436a in software 435a executing on CPU 430a assigns a particular set of the copy rules 128 (e.g., RULES 00 and 01 or other copy rules) to the CPU queues 0a-7a, as discussed in U.S. patent application Ser. No. 11/198,056, entitled "PRIORITIZATION OF NETWORK TRAFFIC SENT TO A PROCESSOR BY USING PACKET IMPORTANCE". The copy rule management engine 436b in software 435b executing on CPU 430b assigns another particular set of copy rules 128 (e.g., RULES 02 and 03 or other copy rules) to the CPU queues 0b-7b. If the packet 115 matches a copy rule that is assigned to one of the CPU queues 0a-7a, then the packet 115 is buffered in one of the CPU queues 0a-7a and then processed by the CPU 430a. On the other hand, if the packet 115 matches a copy rule that is assigned to one of the CPU queues 0b-7b, then the packet 115 is buffered in one of the CPU queues 0b-7b and then processed by the CPU 430b. It is also possible for a copy rule to be assigned to more than one CPU, for example a copy rule can be assigned to one of the queues 0a-7a for CPU 325a and also to one of the queues 0b-7b for CPU 325b. Note that in this case, the queues assigned to each CPU do not have to be identical, for example, a single packet 115 can be copied to CPU queue 3a of CPU 430a and also to CPU queue 7b of CPU 430b.

Also, typically one CPU (e.g., CPU 430*a*) would manage the device hardware 120, while another CPU (e.g., CPU 430*b*) could send messages to CPU 430*a* in order to instruct the CPU 430*a* to reprogram the CPU queues (i.e., re-prioritize the copy queues) or to reprogram the copy rule priorities (i.e., re-prioritize the copy rules), or to change other configurations.

However, if the search logic 131 has detected that a packet has exceeded a packet rate associated with a given match-bit/valid-bit value pair, then the packet will not be copied to any of the multiple CPU queues and will not be processed by any of the multiple CPUs, even if at least one of the copy rules 128 are triggered by the packet traffic. In the example of FIG. 2, only a single uncopy bit 270 is described as a part of the action fields in the search logic 131. In an alternative embodiment of the invention where multiple processors are used as in FIG. 4, a separate uncopy bit 270 will be associated with each CPU. Therefore, in this alternative embodiment, Table 200 in FIG. 2 will have multiple uncopy bits 270 (one uncopy bit per CPU). This embodiment would allow, for example, certain CPUs to receive more or less protection from network traffic, depending on the functions that they perform.

This embodiment could be extended even further to allow separate rate thresholds 261 for each CPU. Therefore, in this extension, Table 200 in FIG. 2 will have multiple rate threshold fields 261 (one threshold field per CPU). This extension permits additional flexibility in the controlling the packets copied to particular CPUs.

Various elements in the drawings may be implemented in hardware, software, firmware, or a combination thereof.

The various engines or software discussed herein may be, for example, computer software, firmware, commands, data files, programs, code, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing disclosure. Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of an embodiment of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

It is also noted that the various functions, variables, or other parameters shown in the drawings and discussed in the text have been given particular names for purposes of identification. However, the function names, variable names, or other parameter names are only provided as some possible examples to identify the functions, variables, or other parameters. Other function names, variable names, or parameter names may be used to identify the functions, variables, or parameters shown in the drawings and discussed in the text.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method for hardware throttling of network traffic, the method comprising:
   receiving a packet;
   determining whether a source address of the packet is found in a lookup table;
   determining a rate that packets having source addresses that are not found in the lookup table are received by a network device; and
   in response to determining that the source address of the packet is not found in the lookup table, preventing the packet from being copied, based on the rate.

2. The method of claim 1, wherein the packet is not copied even if a copy rule is triggered.

3. The method of claim 1, wherein the packet is prevented from being copied if the rate exceeds a threshold rate.

4. The method of claim 1, wherein the packet information comprises at least one of: MAC source address, IP source address, TCP connection address, MAC destination address, IP destination address, ingress port identifier, egress port identifier, VLAN identifier, packet protocol, or other packet information.

5. The method of claim 1, wherein the step of preventing the packet from being copied comprises:
   limiting the number of packets copied to the processor based upon a comparison between the packet information and the values in lookup flag fields and lookup fields, and based upon values in the corresponding rate and threshold fields, and the corresponding action fields.

6. The method of claim 1, further comprising:
   determining the rate by use of a metering engine.

7. The method of claim 1, further comprising:
determining the rate by counting the packets, bytes of the packets, or any other measure derived from the packets.

8. The method of claim 1, further comprising:
using a valid bit to indicate if a lookup was performed on the packet.

9. The method of claim 8, further comprising:
using a match bit to indicate if the packet information matches content in a forwarding table.

10. The method of claim 9, further comprising:
reading the values in the packet information, of the valid bit, of the match bit, of the lookup fields, of the rate fields, and of the action fields to determine any action to be performed on the packet.

11. The method of claim 1, wherein the network device comprises one of: a network switch or a router.

12. An apparatus for hardware throttling of network traffic, the apparatus comprising:
a network device configured to receive a packet, determine whether a source address of the packet is found in a lookup table, determine a rate that packets having source addresses that are not found in the lookup table are received by the apparatus, and, in response to determining that the source address of the packet is not found in the lookup table, prevent the packet from being copied, based on the rate.

13. The apparatus of claim 12, wherein the packet is not copied even if a copy rule is triggered.

14. The apparatus of claim 12, wherein the packet is prevented from being copied if the rate exceeds a threshold rate.

15. The apparatus of claim 12, wherein the packet information comprises at least one of: MAC source address, IP source address, TCP connection address, MAC destination address, IP destination address, ingress port identifier, egress port identifier, VLAN identifier, packet protocol, or other packet information.

16. The apparatus of claim 12, wherein the number of packets copied to the processor is limited based upon a comparison between the packet information and the values in lookup flag fields and lookup fields, and based upon values in the corresponding rate and threshold fields, and the corresponding action fields.

17. The apparatus of claim 12, wherein the network device further comprises:
a metering engine configured to determine the rate associated with the packet information.

18. The apparatus of claim 12, wherein the network device further comprises:
a metering engine configured to determine the rate by counting the packets, bytes of the packets, or any other measure derived from the packets.

19. The apparatus of claim 12, wherein the network device is configured to use a valid bit to indicate if a lookup was performed on the packet.

20. A method for hardware throttling of network traffic, the method comprising:
receiving a packet;
determining whether a source address of the packet is found in a lookup table;
determining a rate that packets having source addresses that are not found in the lookup table are received by a network device; and
in response to determining that the source address of the packet is not found in the lookup table, preventing the packet from being copied to at least one of a plurality of processors, based on the rate.

21. An apparatus for hardware throttling of network traffic, the apparatus comprising:
means for receiving a packet;
means for determining whether a source address of the packet is found in a lookup table;
means for determining a rate that packets having source addresses that are not found in the lookup table are received by the apparatus; and
means for, in response to determining that the source address of the packet is not found in the lookup table, preventing the packet from being copied, based on the rate.

22. An article of manufacture, comprising:
a machine-readable medium having stored thereon instructions to:
receive a packet;
determine whether a source address of the packet is found in a lookup table;
determine a rate that packets having source addresses that are not found in the lookup table are received by the article; and
in response to determining that the source address of the packet is not found in the lookup table, prevent the packet from being copied, based on the rate.

* * * * *

UNITED STATES PATENT AND TRADEMARK OFFICE
CERTIFICATE OF CORRECTION

PATENT NO. : 7,672,293 B2  Page 1 of 2
APPLICATION NO. : 11/373631
DATED : March 2, 2010
INVENTOR(S) : Mark Gooch et al.

It is certified that error appears in the above-identified patent and that said Letters Patent is hereby corrected as shown below:

Delete drawing sheet 4, and substitute the attached sheet 4 therefor.

Signed and Sealed this

Tenth Day of August, 2010

David J. Kappos
*Director of the United States Patent and Trademark Office*

FIG. 4